United States Patent Office 2,800,497
Patented July 23, 1957

2,800,497

METHOD OF MANUFACTURING OMEGA-CHLOROCARBOXYLIC ACID NITRILES

Heinz Indest, Erlenbach (Main), Germany, assignor to Vereinigte Glanzstoff-Fabriken A. G., Wuppertal-Elberfeld, Germany, a corporation of Germany No Drawing. Application March 4, 1955, Serial No. 492,305

Claims priority, application Germany March 6, 1954

7 Claims. (Cl. 260—465.7)

This invention relates to the manufacture of aliphatic omega-chlorocarboxylic acid nitriles. In particular, it is directed to the manufacture of chlorocarboxylic acid nitriles having the general formula $Cl.(CH_2)_n$—$CN$ wherein $n$ designates a cardinal number in the series 4 to 11 from the corresponding dichlorides of the general formula $Cl.(CH_2)_n.Cl$, $n$ having the significance aforesaid.

Aliphatic omega-chloro-carboxylic acid nitriles, as is well known, are obtained occasionally as by-products in the course of the manufacture of aliphatic dinitriles by the interaction of omega-dichloroparaffins with salts of hydrocyanic acid. In such method, 80 to 90 percent of the end products are dinitriles and from 20 to 10 percent are the chloronitriles. Investigations have been carried out to obtain the omega-chlorocarboxylic acid nitriles as the principal product by using quantities of alkali metal cyanides calculated on the basis of the one-side reaction of the dichloroparaffins, but the yields thus obtained have been unsatisfactory. Even in the most favorable cases, only 40 percent of the chloronitriles were obtained calculated upon the quantity of the dichloroparaffins that were reacted; large quantities of the dinitriles being produced as by-products. An economic and technologically useful synthesis of the omega-chlorocarboxylic acid nitriles cannot be obtained by that procedure. It has also been proposed to manufacture the omega-chloronitriles from the omega-bromo-omega'-chloroparaffins. The latter, however, are not readily available.

In accordance with the instant invention, omega, omega'-dichloroparaffins having a carbon chain length of from 4 to 11 are reacted with from 0.4 to 2.2 mols of a salt of hydrocyanic acid in a mixture of solvents composed of water and of alcohol; and the reaction time is so controlled or limited that the omega-chlorocarboxylic acid nitrile is the sole, or the predominant, product of the reaction.

It was surprising and unexpected to discover that the reaction of the omega, omega'-dichloroparaffins with alkali metal cyanides takes place in technically complete, separable stages; and can be so carried out that excellent yields of the chlorocarboxylic acid nitriles are produced while the formation of the dinitriles is suppressed. The unreacted omega,omega'-dichloroparaffins can be returned for the reaction.

The process can be carried out by using for one mol of the selected dichloride, from 1 to 2.2 mols of an alkali metal cyanide, refluxing the reaction mixture, or heating the reaction mixture (depending upon the particular alcohol being used) to a temperature of from 70° to 100° C., preferably to 80° C., while limiting the reaction time of an interval of from three to four hours, preferably 3.5 hours. By these steps, side reactions are substantially avoided, the yields of the omega-chlorocarboxylic acid nitriles being increased to over 90 percent, calculated on the basis of the dichloroparaffin that is converted, about 60 percent of the dichloroparaffin used being recovered. The recovered dichloride is returned to the reaction so that the process operates on a highly economic basis, above 90 percent, and mostly over 95 percent of the starting material being converted to the omega-chlorocarboxylic acid nitrile in accordance with the instant invention. The same reaction can be obtained by changing the molar ratio of dichloride: alkali cyanide to that of 1 mol of the dichloride per 0.8 to 0.4 mol of the alkali cyanide and increasing the period of heating the reactants as a consequence of the reduction in the molar ratio. For example, when 1 mol of dichloride and 0.8 mol of NaCN are interacted, the heating period is four hours; for 0.7 mol of NaCN the heating period is seven hours; and for 0.4 mol of NaCN the heating period is thirteen hours.

The following table shows the relationship or dependency of the heating period to the molar ratio in the case of the interaction of 1,6-dichlorohexane with sodium cyanide to form 7-chloroheptanoic acid nitrile:

| NaCN, Mol | Dichloro-Hexane, Mol | Heating Time, Hours | Conversion to Chloro-heptanoic Acid Nitrile, Percent | Yield on Basis of Non-Recovered Dichloro-Hexane, Percent |
|---|---|---|---|---|
| 2.2 | 1.0 | 3.5 | 38.5 | 98 |
| 2.0 | 1.0 | 3.5 | 38 | 99 |
| 1.2 | 1.0 | 3.5 | 37 | 97 |
| 1.0 | 1.0 | 3.5 | 38 | 96 |
| 0.8 | 1.0 | 4.0 | 37 | 99 |
| 0.7 | 1.0 | 7.0 | 37 | 99 |
| 0.6 | 1.0 | 8.0 | 40 | 98 |
| 0.5 | 1.0 | 10.0 | 37 | 99 |
| 0.4 | 1.0 | 13.0 | 37 | 98 |
| 0.3 | 1.0 | 12.0 | 29.5 | 92 |

The reaction is carried out in a mixture of water and a water-miscible or partially water-soluble organic solvent, preferably with aqueous solutions of alcohols such as methanol, ethanol, propanol, butanol, amyl alcohols or tetrahydrofurfuryl alcohol. The reaction takes place when the materials are heated to a temperature of from 70° to 100° C., mostly at the boiling point of the mixture of the solvent, preferably at 80° C. A small quantity of potassium iodide may be added as a catalyst. When the determined reaction time is exceeded by one-half to one hour, the dinitrile is formed rather than the further conversion to the desired chloronitrile so that the yield of the chloronitrile is correspondingly reduced.

If the solvent is driven off after the termination of the reaction resulting in the formation of the chloronitriles, the solvents, preferably, should be removed at temperatures not exceeding about 50° C. and under reduced pressure to prevent continued reaction during removal of the solvent. It is possible, however, particularly when low boiling alcohols are used as solvents to carry out the process so that the organic solvent volatilizes during the reaction, and the total reaction time is so set that formation of dinitriles does not take place.

The residue is an aqueous solution which contains in addition to excess cyanide, the formed organic chloride to the extent that the same is not crystallized. In addition, very small quantities of the formed chloronitrile may also be present. Above that residue is a second layer consisting of the unreacted omega,omega'-chloroparaffin components and the formed chloronitrile. The upper layer is separated, and the lower layer, if necessary, extracted, for example, with ether or benzene, and the extract combined with the upper layer. The upper layer is then dried and fractionally distilled. In the process, as thus summarized, from 35 to 40 percent of the omega, omega'-dichloroparaffin undergoes reaction. The corresponding chloronitrile produced is readily obtained in pure form in a yield of over 95 percent taking into consideration losses due to manipulation of materials. The recovered omega,omega'-chloroparaffin can be re-used for further reaction; and also the aqueous mother liquor to the extent that it contains excess cyanide, after separation therefrom of the crystallized metal halides, mostly sodium chloride.

The omega-chlorocarboxylic acid nitriles produced by the method of this invention are valuable intermediates. In particular, the chlorine can be replaced by nitrogen-or sulphur-containing groups, and the products thus obtained can be employed for the synthesis of linear high polymer products, in particular, such as are used for the manufacture of threads, fibers, foils or films.

*Example 1*

350 grams of sodium cyanide (95 percent) = 6.8 moles were dissolved in a mixture of 1500 grams of ethanol and 50 grams of water. This solution, 900 grams = 5.8 moles of 1,6-dichlorohexane were added and the mixture was refluxed for 3½ hours. The reaction temperature was 80° C. After cooling, the alcohol was removed under vacuum on a water bath heated to 50° C. The residue formed two layers. Sodium chloride crystallized out from the lower layer and was separated therefrom After that separation, this layer was extracted with benzene in a circulating extractor. The sodium cyanide solution, containing the sodium chloride, thus obtained, can be employed for a new batch. The extract from the lower layer was combined with the upper layer. This benzene solution was washed by shaking it out several times with water until it became neutral. The benzene was distilled off, and the unreacted dichlorohexane was distilled off in a column at 85° C. under a pressure of 15 mm. (mercury gauge). 554 grams = 61.5 percent of dichlorohexane were recovered. The following fraction boiled at 131° C. at 15 mm. (Hg gauge) and constituted 314 grams (2.15 moles) of 7-chloroheptanoic acid nitrile which was directly obtained in pure form. No suberic acid dinitrile was formed. The conversion was 37.2 percent; the yield 96.6 percent of 7-chloroheptanoic acid nitrile calculated upon the 1,6-dichlorohexane which was not recovered.

*Example 2*

A similar batch as in Example 1 was refluxed for 1.5 hours. The ethanol was distilled off over a period of 2 hours until the vapor temperature had risen to 98° C. The residue consisting of 2 layers was worked up as in Example 1. 565 grams of 1,6-dichlorohexane were recovered and 306 grams of 7-chloroheptanoic acid nitrile were obtained. This is a 97.4 percent yield calculated on the conversion of the 1,6-dichlorohexane.

*Example 3*

155 grams = 1 mole of dichlorohexane were refluxed with 59 grams of 95 percent sodium cyanide (1.15 moles) dissolved in a mixture of 80 grams of water and 300 grams af amyl alcohol for 3½ hours. The solvent was removed under vacuum and the residue mixed with water and benzene and worked up as in Example 1. In addition to the recovered 1,6-dichlorohexane, 52 grams of 7-chlorheptanoic acid nitrile were obtained.

*Example 4*

155 grams = 1 mole of 1,6-dichlorohexane were refluxed with a solution of 49 grams of 95 percent of sodium cyanide (0.95 mole) in a mixture of 100 grams of water and 600 grams of tetrahydrofurfurylalcohol for 3.5 hours at 80° C. The tetrahydrofurfurylalcohol and the water were distilled off under vacuum (15 mm. mercury gauge), the temperature rising to 69° C. and the mass worked up as in Example 3. 98 grams = 63.2 percent of the unreacted dichlorohexane were recovered and 47 grams = 0.323 mole of the chloroheptanoic acid nitrile were produced. The yield was 87.6 percent calculated on the computed conversion of the 1,6-dichlorohexane.

*Example 5*

1000 grams = 7.8 moles of 1,4-dichlorobutane were refluxed with 460 grams = 8.91 moles of sodium cyanide in a solution of 2000 grams of 90 percent ethanol and 600 grams of water for 3.5 hours. The alcohol was then vaporized under reduced pressure; the upper layer isolated as in Example 1; and the recovered dichlorobutane and the reaction product were fractionated at reduced pressure. 559 grams of 1,4-dichlorobutane = 55.9 percent and 396 grams = 3.34 moles of 5-chlorovaleric acid nitrile were recovered; yield = 96.8 percent of the converted 1,4-dichlorobutane.

*Example 6*

1000 grams = 7.09 moles of 1,5-dichloropentane were refluxed with 2000 grams of 95 percent alcohol and 400 grams of water containing 350 grams of 95 percent sodium cyanide (6.78 moles) for 3.5 hours. After working up as in Example 1, 590 grams = 59 percent of 1,5-dichloropentane were recovered, and 374 grams = 2.84 moles of the chlorocaproic acid nitrile were produced. This corresponds to a conversion of 41 percent and a yield of 97.8 percent.

*Example 7*

169 grams = 1mole of 1,7-dichloroheptane were refluxed with 59 grams of 95 percent sodium cyanide (1.14 moles) in a solution of 800 grams of 95 percent alcohol and 150 grams of water for 3.5 hours. The alcohol was removed under vacuum and the mass worked up as in Example 1. In addition to 106 grams of unreacted 1,7-dichloroheptane, 55 grams of 8-chloroctanoic acid nitrile (boiling point 146° C. at 15 mm. mercury gauge) were obtained. Yield 92.2 percent of the unrecovered dichloroheptane.

*Example 8*

211 grams = 1 mole of 1,10-dichlorodecane were refluxed with 60 grams of 95 percent sodium cyanide (1.16 moles) in 1000 grams of 95 percent alcohol and 150 grams of water for 3.5 hours. After working up in accordance with Example 1, 75 grams = 0.372 moles of 11-chloroundecanoic acid nitrile (boiling point of 138° C. at 1 mm. mercury gauge) in addition to the unreacted 1,10-dichlorodecane were obtained.

*Example 9*

500 grams = 3.22 moles of dichlorohexane were refluxed with a solution of 100 grams of 95 percent sodium cyanide (1.94 moles) in 1000 grams of 95 percent alcohol and 200 grams of water for 8 hours. The product was worked up in accordance with Example 1. 292 grams = 58.4 percent of the 1,6-dichlorohexane were recovered. The yield was 189 grams = 1.30 moles of 7-chloroheptanoic acid nitrile. This yield is 97 percent calculated the computed conversion (40.2 percent) of the 1,6-dichlorohexane.

As pointed out, the reaction time to achieve optimum conversion of the dichloroparaffins to the chlorocarboxylic nitriles varies in dependence upon the molar ratio of the cyanide to the dichloroparaffin. The time interval with respect to a particular molar ratio can readily be determined by laboratory test.

Among the cyanides which may be used for interaction with the omega, omega'-chloroparaffins, as set forth above, are: ammonium cyanide, alkaline earth cyanides such as calcium cyanide, strontium cyanide.

Among the organic solvents which are at least partially water miscible and suitable for carrying out the conversion of the omega, omega'-dichloroparaffin to the corresponding omega-carboxylic acid nitriles are: ketones, such as acetone, methylethyl ketone, etc.; diethylketone, acetonitrile and other nitriles.

The proportions of the organic solvent and the water in the medium in which the interaction of the omega, omega'-dichloroparaffin and the cyanide is carried out may vary in amounts from 1 to 50 parts of the organic solvent to 1 part of water, preferably from 2 to 20 parts of the organic solvent to 1 part of water.

It will be understood that the foregoing description of the invention and the examples set forth are merely illustrative thereof. Accordingly, the appended claims are to be construed as defining the invention within the full spirit and scope thereof.

I claim:

1. Method of manufacturing aliphatic omega chlorocarboxylic acid nitriles of the general formula Cl.(CH$_2$)$_n$.CN wherein $n$ is a cardinal number in the series 4 to 11 which comprises reacting an omega, omega'-dichloroparaffin of the general formula Cl.(CH$_2$)$_n$.Cl wherein $n$ has the significance above defined with an alkali metal salt of hydrocyanic acid in a medium of water and an alcohol which is at least partially miscible with water at a temperature of from 70° C. to 100° C., the molar ratio of the cyanide to the dichloroparaffin being approximately 0.8 to 1.2:1, the reaction time being about 3 to 4 hours.

2. Method of manufacturing aliphatic omega chlorocarboxylic acid nitriles of the general formula Cl.(CH$_2$)$_n$.CN wherein $n$ is a cardinal number in the series 4 to 11 which comprises reacting an omega, omega'-dichloroparaffin of the general formula Cl.(CH$_2$)$_n$.Cl wherein $n$ has the significance above defined with an alkali metal salt of hydrocyanic acid in a medium of water and ethanol at a temperature of from 70° C. to 100° C., the molar ratio of the cyanide to the dichloroparaffin being approximately 0.8 to 1.2:1 and the reaction time being about 3 to 4 hours.

3. Method of manufacturing of 5-chlorovaleric acid nitrile which comprises reacting 1,4-dichlorobutane with sodium cyanide in a medium of water and an alcohol which is at least partially miscible with water at a temperature of from 70° C. to 100° C., the molar ratio of the cyanide to the dichlorobutane being approximately 0.8 to 1.2:1 and the reaction time being about 3 to 4 hours.

4. Method of manufacturing of 6-chlorocaproic acid nitrile which comprises reacting 1,5-dichloropentane with sodium cyanide in a medium of water and an alcohol which is at least partially miscible with water at a temperature of from 70° C. to 100° C., the molar ratio of the cyanide to the dichloropentane being approximately 0.8 to 1.2:1 and the reaction time being about 3 to 4 hours.

5. Method of manufacturing of 7-chloroheptanoic acid nitrile which comprises reacting 1,6-dichlorohexane with sodium cyanide in a medium of water and an alcohol which is at least partially miscible with water at a temperature of from 70° C. to 100° C., the molar ratio of the cyanide to the dichlorohexane being approximately 0.8 to 1.2:1 and the reaction time being between about 3 to 4 hours.

6. Method of manufacturing of 8-chlorooctanoic acid nitrile which comprises reacting 1,7-dichloroheptane with sodium cyanide in a medium of water and an alcohol which is at least partially miscible with water at a temperature of from 70° C. to 100° C., the molar ratio of the cyanide to the dichloroheptane being approximately 0.8 to 1.2:1 and the reaction time being between about 3 to 4 hours.

7. Method of manufacturing of 11-chloroundecanoic acid nitrile which comprises reacting 1,10-dichlorodecane with sodium cyanide in a medium of water and an alcohol which is at least partially miscible with water at a temperature of from 70° C. to 100° C., the molar ratio of the cyanide to the dichlorodecane being approximately 0.8 to 1.2:1 and the reaction time being between about 3 to 4 hours.

References Cited in the file of this patent

UNITED STATES PATENTS

| | | |
|---|---|---|
| 2,415,261 | Rogers | Feb. 4, 1947 |
| 2,425,426 | Joyce | Aug. 12, 1947 |